United States Patent
Shaw et al.

(10) Patent No.: US 11,044,773 B2
(45) Date of Patent: Jun. 22, 2021

(54) DUAL SESSION PACKET DATA NETWORK CONNECTION

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 207 days.

(21) Appl. No.: 15/827,284

(22) Filed: Nov. 30, 2017

(65) Prior Publication Data
US 2019/0166644 A1   May 30, 2019

(51) Int. Cl.
*H04W 76/16* (2018.01)
*H04L 12/24* (2006.01)
(Continued)

(52) U.S. Cl.
CPC ......... *H04W 76/16* (2018.02); *H04L 41/0803* (2013.01); *H04L 41/0896* (2013.01);
(Continued)

(58) Field of Classification Search
CPC . H04W 76/27; H04W 72/0413; H04W 48/18; H04W 76/11; H04W 8/08;
(Continued)

(56) References Cited

U.S. PATENT DOCUMENTS

| 8,788,677 B2 | 7/2014 | Vihtari |
| 8,867,362 B2 | 10/2014 | De Franca Lima et al. |

(Continued)

FOREIGN PATENT DOCUMENTS

| EP | 2983405 A1 | 2/2016 |
| WO | WO 2012122910 A1 | 9/2012 |

(Continued)

OTHER PUBLICATIONS

Jha et al., "Dual connectivity in LTE small cell networks", Globecom Workshops (GC Wkshps), 2014. IEEE, 2014. pp. 1205-1210. https://www.researchgate.net/publication/282917957_Dual_Connectivity_in_LTE_small_cell_networks.

(Continued)

*Primary Examiner* — Adad M Nawaz
*Assistant Examiner* — Najeeb Ansari

(57) ABSTRACT

A processing system of a cellular network having a processor may receive, from an endpoint device via one of a first radio access infrastructure or a second radio access infrastructure of the cellular network, a request to establish a connection to a packet data network via the cellular network. The processing system may establish, in response to the request, a first session for the endpoint device via the first radio access infrastructure, and a second session for the endpoint device via the second radio access infrastructure of the cellular network, where the connection to the packet data network includes the first session and the second session. The processing system may further configure the first session or the second session for control plane signaling for the connection, and configure the first session, the second session, or both the first session and the second session for user plane communications for the connection.

20 Claims, 3 Drawing Sheets

(51) Int. Cl.
*H04W 48/18* (2009.01)
*H04W 88/16* (2009.01)
*H04W 84/04* (2009.01)
*H04W 36/14* (2009.01)

(52) U.S. Cl.
CPC .......... *H04L 41/12* (2013.01); *H04L 41/5019* (2013.01); *H04W 48/18* (2013.01); *H04W 36/14* (2013.01); *H04W 84/042* (2013.01); *H04W 88/16* (2013.01)

(58) Field of Classification Search
CPC ............. H04W 36/0022; H04W 72/02; H04W 72/0406; H04W 76/10; H04W 76/15; H04W 88/08
See application file for complete search history.

(56) References Cited

U.S. PATENT DOCUMENTS

| | | | |
|---|---|---|---|
| 9,282,495 | B1 | 3/2016 | McKeeman et al. |
| 9,516,512 | B2 | 12/2016 | Yi et al. |
| 9,516,688 | B2 | 12/2016 | Konstantinou et al. |
| 9,538,575 | B2 | 1/2017 | Yamada |
| 9,609,558 | B2 | 3/2017 | Panchal et al. |
| 9,756,586 | B2 | 9/2017 | Rahman et al. |
| 2014/0192740 | A1 | 7/2014 | Ekpenyong et al. |
| 2014/0362829 | A1 | 12/2014 | Kazmi et al. |
| 2015/0124748 | A1 | 5/2015 | Park et al. |
| 2015/0131578 | A1 | 5/2015 | Baek et al. |
| 2015/0264621 | A1 | 9/2015 | Sivanesan et al. |
| 2015/0334551 | A1 | 11/2015 | Aminaka et al. |
| 2016/0037411 | A1 | 2/2016 | Franklin et al. |
| 2016/0095004 | A1 | 3/2016 | Tseng |
| 2016/0095108 | A1 | 3/2016 | Ryoo et al. |
| 2016/0127943 | A1 | 5/2016 | Shaw et al. |
| 2016/0192257 | A1 | 6/2016 | Zhu et al. |
| 2017/0048739 | A1 | 2/2017 | Jeong et al. |
| 2017/0111187 | A1 | 4/2017 | Zanier et al. |
| 2017/0134993 | A1 | 5/2017 | Wang |
| 2017/0230873 | A1 | 8/2017 | Baek et al. |
| 2017/0257183 | A1 | 9/2017 | Vikberg et al. |
| 2017/0288752 | A1 | 10/2017 | Yi et al. |
| 2017/0289858 | A1 | 10/2017 | Faccin et al. |
| 2017/0295517 | A1 | 10/2017 | Nguyen et al. |
| 2017/0303286 | A1 | 10/2017 | Sang et al. |
| 2018/0098251 | A1* | 4/2018 | Li ..................... H04W 36/0016 |
| 2018/0227743 | A1* | 8/2018 | Faccin ................ H04L 65/1069 |
| 2019/0058997 | A1* | 2/2019 | Futaki .................. H04W 76/27 |
| 2019/0116631 | A1* | 4/2019 | Talebi Fard ............ H04W 8/08 |
| 2019/0124508 | A1* | 4/2019 | Watfa ..................... H04W 8/02 |
| 2019/0124561 | A1* | 4/2019 | Faccin ............. H04W 36/0022 |
| 2019/0124589 | A1* | 4/2019 | Bogineni ............... H04W 48/18 |
| 2019/0274178 | A1* | 9/2019 | Salkintzis ............. H04W 76/15 |
| 2020/0170066 | A1* | 5/2020 | Yang ..................... H04W 76/18 |
| 2020/0236727 | A1* | 7/2020 | Salkintzis ............. H04W 48/18 |

FOREIGN PATENT DOCUMENTS

| | | |
|---|---|---|
| WO | WO 2016162045 A1 | 10/2016 |
| WO | WO 2016169059 A1 | 10/2016 |
| WO | WO 2016204664 A1 | 12/2016 |
| WO | WO 2017005478 A1 | 1/2017 |
| WO | WO 2017035305 A1 | 3/2017 |
| WO | WO 2017078779 A1 | 5/2017 |
| WO | WO 2017088931 A1 | 6/2017 |

OTHER PUBLICATIONS

Mohamed et al., "Control-data separation architecture for cellular radio access networks: A survey and outlook", IEEE Communications Surveys & Tutorials vol. 18 Issue 1 (2016): 446-465. 21 Pages. http://ieexplore.ieee.org/abstact/document/7140736/.

Agyapong et al., "Design considerations for a 5G network architecture", IEEE Communications Magazine vol. 52 Issue 1 (Nov. 2014). 19 Pages.

"3rd Generation Partnership Project; Technical Specification Group Radio Access Network; Study on New Radio Access Technology; Radio Interface Protocol Aspects (Release 14)", 3GPP TR 38.804 V14.0.0, 3GPP (Mar. 2017), 57 Pages.

"4G-5G Interworking", Samsung (Jun. 2017), 17 Pages. http://www.samsung.com/global/business-images/insights/2017/4G-5G-interworking-0.pdf.

Ratasuk et al., "Carrier Aggregation and Dual Connectivity", ISART2017, Nokia Bell Labs (2017), 14 Pages. https://www.its.bldrdoc.gov/media/66437/ratasuk_isart2017.pdf.

Da Silva et al., "A novel state model for 5G radio access networks ", 2016 IEEE International Conference on Communications Workshops (ICC) (2016), 6 Pages. https://metis-ii.5g-ppp.eu/wp-content/uploads/publications/2016/2016-05-ICC-A-novel-state-model-for-5G-radioaccess-networks.pdf.

Giordani et al., "Multi-connectivity in 5G mmWave Cellular Networks", 2016 Mediterranean Ad Hoc Networking Workshop (Med-Hoc-Net) (2016), 7 Pages. https://arxiv.org/pdf/1605.00105v1.pdf.

"Wireless Technology Evolution Towards 5G: 3GPP Release 13 to Release 15 and Beyond", 5G Americas, www.5gamericas.org (Feb. 2017), 243 Pages. http://www.5gamericas.org/files/6814/8718/2308/3GPP_Rel_13_15_Final_to_Upload_2.14.17_AB.pdf.

* cited by examiner

DUAL SESSION PACKET DATA NETWORK CONNECTION

The present disclosure relates generally to wireless communication networks, and more particularly to devices, non-transitory computer-readable media, and methods for establishing a dual session packet data network connection via a cellular network.

BACKGROUND

A cloud radio access network (RAN) is part of the 3rd Generation Partnership Project (3GPP) fifth generation (5G) specifications for mobile networks. As part of the migration of cellular networks towards 5G, a cloud RAN may be coupled to an Evolved Packet Core (EPC) network until new cellular core networks are deployed in accordance with 5G specifications. For instance, a cellular network in a "non-stand alone" (NSA) mode architecture may include 5G radio access network components supported by a fourth generation (4G)/Long Term Evolution (LTE) core network (e.g., an EPC network). However, in a 5G "standalone" (SA) mode point-to-point or service-based architecture, components and functions of the EPC network may be replaced by a 5G core network. 5G is intended to deliver superior high speed and performance. However, during initial deployments, 5G may suffer from limited coverage areas, high costs of deployment, slow rollout, and more costly initial subscription plans.

SUMMARY

In one example, the present disclosure discloses a device, computer-readable medium, and method for establishing a dual session packet data network connection via a cellular network. For example, a method may include a processing system of a cellular network having a processor receiving, from an endpoint device via one of a first radio access infrastructure of the cellular network or a second radio access infrastructure of the cellular network, a request to establish a connection to a packet data network via the cellular network. The processing system may establish, in response to the request, a first session for the endpoint device via the first radio access infrastructure, and a second session for the endpoint device via the second radio access infrastructure of the cellular network, where the connection to the packet data network includes the first session and the second session. The processing system may further configure the first session or the second session for control plane signaling for the connection, and configure the first session, the second session, or both the first session and the second session for user plane communications for the connection.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
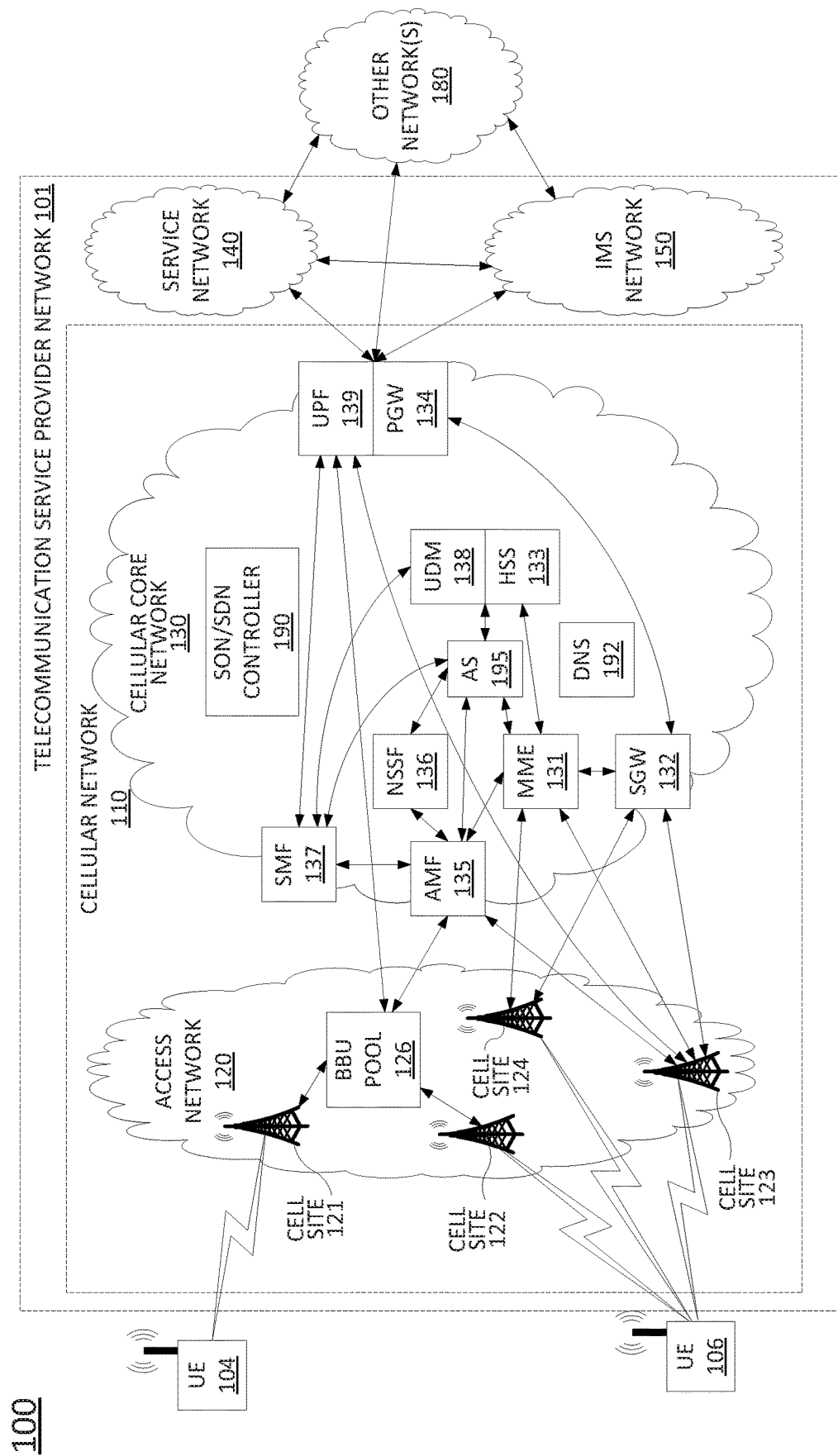
FIG. 1 illustrates a block diagram of an example system, in accordance with the present disclosure.

The present disclosure broadly discloses methods, computer-readable media, and devices for establishing a dual session packet data network connection via a cellular network. In one example, the present disclosure provides a dual radio enabled endpoint device that may initiate a service request (e.g., a request for a connection to a packet data network (PDN)). The request may be a request for a radio resource connection (RRC) for both a 4G session (e.g., a packet data protocol (PDP) session) and a 5G session. In one example, the request may be initially sent by the endpoint device and received by the cellular network via first or second radio access network infrastructure (e.g., a 4G eNodeB or a 5G "new radio" (NR)). In one example, the first or second radio access network infrastructure may issue a temporary RRC "hold" time and a "keep-alive" time for a respective session via the first or second radio access network infrastructure.

Examples of the present disclosure also include dynamic automatic service discovery (d-ASD). In particular, the cellular network may auto-instantiate communications channels (slice, bearer, PDN connection, etc.) to support the service associated with the request. For instance, in one example, the first or second radio access network infrastructure forwards the request to a service layer 4G/5G interworking device (e.g., an application server) deployed in the communication network. In one example, the request may be forwarded via a mobility management entity (MME) or an access and mobility management function (AMF) depending upon which radio access technology (e.g., 4G or 5G) is used by the endpoint device to send the request.

In one example, the interworking device may determine a service level agreement (SLA) requirement for the user plane associated with the request. For instance, the interworking device may obtain subscriber SLA information from a home subscriber server (HSS) and/or a unified data management function (UDM). The interworking device may also obtain a selection of a network slice for the 5G session from a network slice selection function (NSSF). In one example, the NSSF may also provide a selection of a network slice for the 4G session. In one example, the NSSF may select the appropriate slice(s) based upon the SLA. The interworking device may then establish the first (4G) session and the second (5G) session for the connection to the PDN based upon the SLA and/or the network slice(s) identified by the NSSF.

In one example, the endpoint device comprises a dual radio device that allows simultaneous 5G and 4/GLTE transmission and/or reception for both data and control channels. In addition, in one example, the endpoint device includes a separate and independent dynamic trusted execution environment (d-TEE) for each of 5G and LTE communications so that independent sessions (associated with a combined PDN connection) can be instantiated on both 5G and LTE without interference. In one example, the present disclosure further provides a dynamic time-to-live (d-TTL) which allows intelligent allocation of resources based on a dynamic assignment of TTL for each 5G and LTE session. For instance, when the system detects an additional need for a session to be extended, the TTL will automatically lengthen. When the system detects there is no need for the session to be extended, the TTL will automatically shorten.

Examples of the present disclosure provide various advantages. For instance, in one example the present disclosure may provide control plane and data plane separation. For instance, a 5G session may be used for the control plane, while an LTE session may be used for the data plane. Such an arrangement may be used to address various scenarios, including emergency events such as earthquakes, hurricanes, tsunamis, volcanic eruptions, etc. In another example, the data plane may be assigned to both the 5G session and the 4G session, while the control plane may be assigned to one or the other of the 5G session or the 4G session. Different arrangements may be used for different scenarios including: real-time high-performance control coupled with non-real time "best effort" data transmission, heterogeneous data performance for massive Internet of Things (IoT) or vehicle-to-everything" (V2X) communications, such as assigning high performance data to use 5G and low or mid-performance to use LTE, and so forth.

In one example, the present disclosure may relate to 3GPP New Radio (NR) and/or 5G radio access technologies operating in the centimeter and millimeter wave frequency band. In one example, millimeter wave (mmWave) spectrum (e.g., spectrum with carrier frequencies between 30 and 300 GHz), is attractive for wireless communications systems since available transmission bandwidth roughly scales with the carrier frequency. However, the coupling loss between a transmitter and a receiver also scales as a function of the transmission bandwidth due to the larger thermal noise floor. In order to overcome the coupling loss at high carrier frequencies, and also because the antenna apertures are much smaller at higher frequencies, antenna arrays with a large number of antenna elements are employed in mmWave communications systems. In addition, these antenna arrays are used to electrically steer transmissions into a certain direction (also known as beamforming) by co-phasing the waveforms of the various antenna elements. The beamformed nature of such a wireless communications system complicates its design and operation. In contrast, LTE/4G radio access networks are omni-directional wireless communications systems and may have a greater range given the same transmit power. Thus, deployments of 5G radio access infrastructure may not fully supplant or make obsolete existing and yet to be deployed 4G/LTE infrastructure. In this regard, the present disclosure may relate to a hybrid, or integrated 4G/LTE-5G cellular core network and more particularly to devices, computer-readable media, and methods for establishing a dual session packet data network connection via a cellular network, as described herein. These and other aspects of the present disclosure are discussed in greater detail below in connection with the examples of FIGS. 1-3.

To better understand the present disclosure, FIG. 1 illustrates an example network, or system 100 in which examples of the present disclosure for establishing a dual session packet data network connection via a cellular network may operate. In one example, the system 100 includes a telecommunication service provider network 101. The telecommunication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the telecommunication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126.

It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

In accordance with the present disclosure, each of cell sites 121-123 may comprise a 5G "new radio" (NR), also referred to as a gNodeB (gNB). For instance, cell sites 121-123 may comprise directional antennas, or antenna arrays (e.g., having a half-power azimuthal beamwidth of 120 degrees or less, 90 degrees or less, 60 degrees or less, etc.), e.g., multiple input multiple output (MIMO) antenna(s). For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz. Cell site 123 may also include a corresponding 5G radio (also referred to as a transceiver, or base station equipment) to receive (and transmit) via directional beam(s), or multi-path and/or spatial diversity signals. For cell sites 121 and 122, BBU pool 126 may include corresponding 5G radios.

In one example, access network 120 may include both 4G/LTE and 5G radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G radios/base station equipment and corresponding connections to 4G and 5G components in cellular core network 130. Furthermore, in accordance with the present disclosure, a base station (e.g., cell sites 121-124 and/or baseband units within BBU pool 126) may comprise all or a portion of a computing device or system, such as computing system 300, and/or processing system 302 as described in connection with FIG. 3 below, and may be configured to provide one or more functions to support examples of the present disclosure for establishing a dual session packet data network connection via a cellular network. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., cell site 124 and/or eNodeB aspects of cell site 123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructure and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a connection to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, the example of FIG. 1 provides a hybrid, or integrated 4G/LTE-5G cellular core network 130. In this regard, FIG. 1 illustrates a connection between AMF 135 and MME 131, e.g., an "N26" interface which may convey signaling between AMF 135 and MME 131 relating to establishing a dual session packet data network connection, and so forth.

In one example, service network 140 may comprise one or more devices for providing services to subscribers, customers, and or users. For example, telecommunication service provider network 101 may provide a cloud storage service, web server hosting, and other services. As such, service network 140 may represent aspects of telecommunication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 121 and 122, respectively, may allocate and deactivate baseband units in BBU pool 126, and may perform other operations for activating antennas based upon a location and a movement of an endpoint device or a group of endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SON/SDN controller 190, which may store configuration codes, e.g., computer/processor-executable programs, instructions, or the like for various functions which can be loaded onto an SDN node. In another example, the SON/SDN controller 190 may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s), and a corresponding transceiver to receive directional beam(s), or multi-path and/or spatial diversity signals. For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz.

In accordance with the present disclosure, each of UE 104 and UE 106 may each be equipped with an antenna array and corresponding transceiver for 4G, which may be designed for operation in a frequency band less than 5 GHz, e.g., 500 MHz to 3 GHz. In addition, in one example, the antenna array (and/or the RF or baseband processing components associated therewith) may not be configured for and/or be capable of beamforming, (e.g., an omnidirectional antenna). Each of UE 104 and UE 106 may also include a gyroscope and compass to determine orientation(s), a global positioning system (GPS) receiver for determining a location, and so forth. In addition, in one example, each of the UE 104 and 106 may comprise all or a portion of a computing device or system, such as computing system 300, and/or processing system 302 as described in connection with FIG. 3 below, and may be configured to provide one or more functions in connection with examples of the present disclosure for establishing a dual session packet data network connection via a cellular network.

In one example, aspects of the present disclosure for establishing a dual session packet data network connection via a cellular network, e.g., as described in greater detail below in connection with the example method 200 of FIG. 2, may be performed by AMF 135. However, in another example, aspects of the present disclosure for establishing a dual session packet data network connection via a cellular network may alternatively or additionally be provided via another device, such as application server (AS) 195. In one example, AS 195 may comprise an application function (AF) in accordance with 5G cellular core network component designations. However, in accordance with the present disclosure, AS 195 may also be in communication with 4G network components, as illustrated by the various links connecting AS 195 to other components in cellular core network 130. In one example, AS 195 may comprise all or a portion of a computing device or system, such as computing system 300, and/or processing system 302 as described in connection with FIG. 3 below, and may be configured to perform various operations in connection with establishing a dual session packet data network connection via a cellular network, e.g., as described in greater detail below in connection with the example method 200 of FIG. 2.

Figure 3:
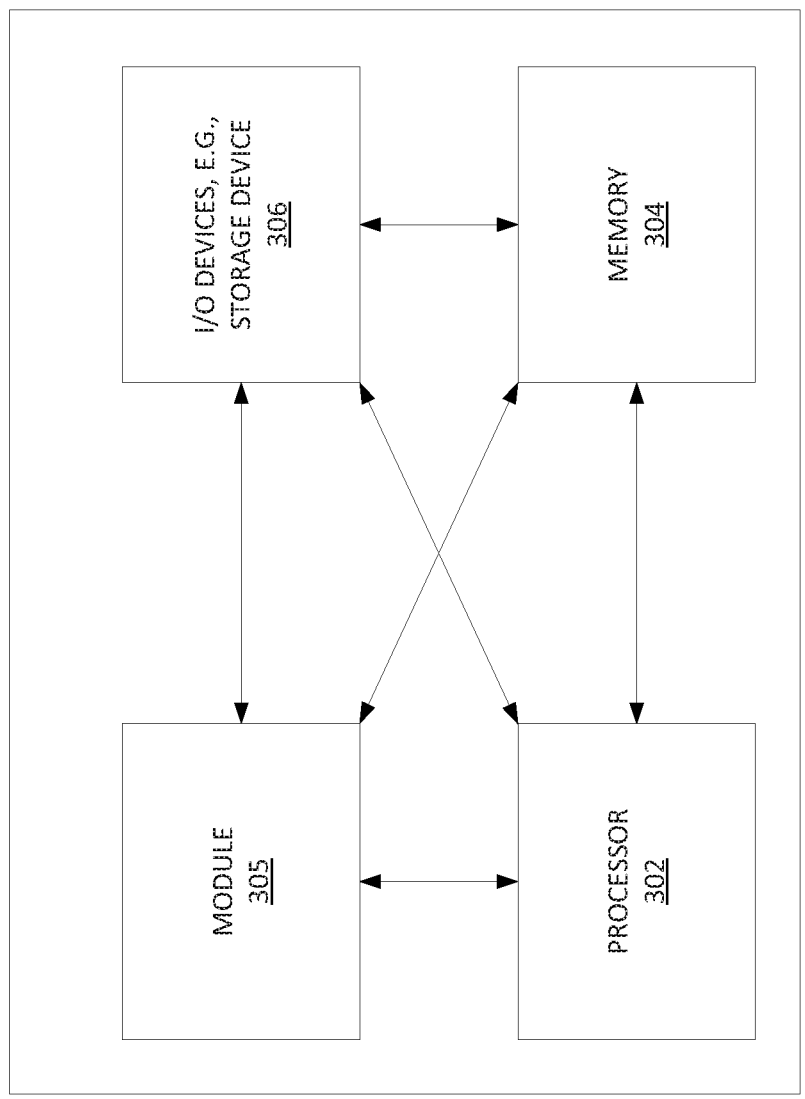
FIG. 3 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As illustrated in FIG. 1, UE 104 may access wireless services via the cell site 121, while UE 106 may access wireless services via any of cell sites 122-124 located in the access network 120. An example of the present disclosure may involve the following steps, functions, operations, and/or processes. First, UE 106 may request service discovery via 4G radio access infrastructure or 5G radio access infrastructure for establishing a connection to a packet data network (PDN) (e.g., one of service network 140, other networks 180, or IMS network 150). For instance, the UE 106 may utilize an LTE radio to transmit the request to MME 131 via cell site 123 or cell site 124 (e.g., an eNodeB), or utilize a 5G radio to transmit the request to AMF 135 via cell site 122 or cell site 123 (e.g., a 5G NR). In one example MME 131 or AMF 135 may forward the request to a session layer 4G/5G interworking device (e.g., AS 195). In addition, in one example, the first or second radio access network infrastructure (the receiving cell site 122-124) may issue a temporary RRC "hold" time and a "keep-alive" time for a respective 4G/LTE or 5G session.

In one example, AS 195 may establish the connection to the PDN by obtaining subscriber information relating to the endpoint device from HSS 133 and/or UDM 138. The subscriber information may include policies, restrictions, authorizations, and the like when may affect which network components are selected to handle the session, the quality of service (QoS) to be provided via the components, and so forth. In one example, AS 195 may also forward the service discovery request, or the identification of the PDN contained in the request, to a domain name server (DNS) 192 to correlate the service discovery request with an appropriate access point name (APN) for the PDN. For ease of illustration, various links between DNS 192 and other components of cellular core network 130 are omitted from FIG. 1.

AS 195 may also obtain a selection of a network slice (or candidate network slices) for the 5G session from NSSF 136. In one example, NSSF 136 may also provide a selection of a network slice (or candidate network slices) for the 4G session. In one example, NSSF 136 may select the appropriate slice(s) based upon the time of day, the SLA, a type of service associated with the request, a network state, a capability of the endpoint device 106, an identity of the PDN, the APN that is obtained from DNS 192, and/or other criteria. In another example, NSSF 136 may provide a selection of available network slices from which AS 195 may select a slice (or slices) in accordance with the same or similar criteria. AS 195 may then establish the first (4G) session and the second (5G) session for the connection to the PDN based upon the available criteria and/or the network slice(s) identified by NSSF 136.

In one example, AS 195 and/or NSSF 136 may monitor a variety of conditions relating to the endpoint device 106 and network conditions. For instance, AS 195 and/or NSSF 136 may detect various conditions relating to time, endpoint device location, user preference, type of service, service conditions, network conditions, and/or device capability. In one example, AS 195 and/or NSSF 136 may be in communication with a variety of devices in cellular core network 130, access network 120, or other portions of cellular network 110 to obtain measurements, flags, statistics, and other data pertaining to the variety of trigger conditions. For instance, AS 195 and/or NSSF 136 may obtain a number of current session threads, a number of assigned and/or available ports, and so forth from AMF 135. In one example, AS 195 and/or NSSF 136 may obtain memory utilization, processor idle time, peak processor utilization, free capacity, and other measurements from AMF 135, SMF 137, UPF 139, MME 131, SGW 132, PGW 134, and so on (or from the NFVI/host device(s) underlying these various network functions). In one example, AS 195 and/or NSSF 136 may utilize one or more of these criteria as an alternative or in addition to the type of service in order to select network slice(s) from among different available 5G and/or LTE network slices.

In one example, to establish the 4G/LTE session, AS 195 may select a PGW, e.g., PGW 134, for accessing the PDN based upon the APN, and may configure SGW 132, cell site 124, and/or PGW 134 to handle traffic between UE 106 and the PDN. In other words, a session via 4G radio access infrastructure may be established for at least a portion of the connection between UE 106 and the PDN. In one example, AS 195 may also configure an MME (e.g., MME 131 to manage the 4G session, including session establishment, teardown, hold time, keep-alive time, and so forth. In another example, a network slice may be designated to include MME 131, SGW 132, and PGW 134. In such an example, AS 195 may instruct MME 131 to establish the session, where MME 131 may configure SGW 132 and PGW 134 to further establish the session for the connection between UE 106 and the PDN. In addition, in such an example, MME 131 may also notify AS 195 of the registration of UE 106 and the activation of the session via SGW 132 and PGW 134.

In one example, to establish the 5G session, AS 195 may send an instruction to AMF 135 according to a response from NSSF 136. In one example, the instruction may also identify that AMF 135 should configure SMF 137 and UPF 139 to establish the 5G session. In another example, AS 195 may send separate instructions to each of AMF 135, SMF 137, and UPF 139 to engage the respective devices for the 5G session. For instance, SMF 137 and UPF 139 may be configured to handle the traffic between UE 106 and the PDN via cell site 122 and BBU pool 126. In other words, a session via 5G radio access infrastructure may be established for at least a portion of the connection between the UE 106 and the PDN. In one example, the request for service discovery (e.g., the request to establish the session) may be received by AMF 135. In one example, AS 195 may engage a different AMF if the different AMF is part of the network slice that is assigned. However, for illustrative purposes, it is assumed that AMF 135 handling the establishment of the session remains part of the session once established. In addition, the portion of BBU pool 126 assigned for cell site 122 or cell site 123 may be configured via a command from the AS 195 and/or AMF 135 to direct traffic to and receive traffic from UPF 139 for communications between UE 106 and the PDN. In one example, AS 195 may also configure SMF 135 to manage the 5G session, including session establishment, teardown, hold time, keep-alive time, and so forth.

In one example, AS 195 may configure the first session or the second session for control plane signaling for the connection. In one example, AS 195 may select the first session (the 4G session) or the second session (the 5G session) for the control plane signaling based upon a variety of conditions that are monitored by AS 195, such as those described above relating to the time of day, the SLA, a type of service associated with the request, a network state, a capability of the endpoint device 106, an identity of the PDN, the APN that is obtained from DNS 192, and/or other criteria. For instance, AS 195 may be configured with a preference to utilize the first session (e.g., using the first (4G) radio access infrastructure) for the control plane since the effective communication distances between a base station and endpoint device are typically greater using 4G frequencies as compared to the higher frequencies (e.g., millimeter wave frequencies) designated for high-data rate communication of 5G, such as high definition streaming video.

To further establish a dual session connection to the PDN, AS 195 may configure the first session, the second session, or both the first session and the second session for user plane communications for the connection. In one example, AS 195 may assign a first data volume or a first percentage of user plane data of the connection to the first session, and assign a second data volume or a second percentage of user plane data of the connection to the second session. In one example, the assigning the first data volume or the first percentage and the assigning the second data volume or the second percentage are based upon the time of day, the SLA, a type of service associated with the request, a network state, a capability of the endpoint device 106, an identity of the PDN, the APN that is obtained from DNS 192, and/or other criteria. For example, as described above, AS 195 may monitor a variety of conditions that may individually or collectively cause AS 195 to apportion respective data volumes or percentages of user plane data of the connection of the endpoint device to the PDN over the 4G radio access infrastructure and the 5G radio access infrastructure.

In one example, AS 195 may send messages to MME 131 and AMF 135 regarding the respective data volumes and/or percentages of user plane data that are assigned to the respective sessions. In one example, MME 131 and AMF 135 may further configure SMF 137, UPF 139, SGW 132, and/or PGW 134 to provide the requisite level of resources and/or to enforce limits in accordance with the allotted data volumes or percentages. In one example, AS 195 may also transmit an instruction to endpoint device 106 containing parameters of the connection to the PDN. In one example, the parameters include an identification of the first session or the second session that is configured for control plane signaling for the connection. The parameters may further include an apportionment of data volumes or percentages of user plane data of the connection of the endpoint device to the PDN over the 4G radio access infrastructure and the 5G radio access infrastructure, an identification of the cell site(s), SGW 132, MME 131, AMF 135, UPF 139 and so forth that are associated with the respective sessions, and so on.

UE 106 may then communicate with the PDN (e.g., one or more servers deployed in the PDN) via the connection by sending user plane data via the first session using a 4G radio and antenna array and via the second session using a 5G radio and antenna array. In addition, control plane data for the connection may be conveyed via the designated first radio access infrastructure or second radio access infrastructure. The respective radios and antenna arrays may be simultaneously active and maintain RRC state with respective cell sites (or 4G and 5G components of a same cell site). In one example, endpoint device 106 includes a separate and independent dynamic trusted execution environment (d-TEE) for each of 5G and LTE communications so that independent sessions (but associated with the combined PDN connection) can be instantiated on both 5G and LTE without interference.

As mentioned above, in one example, the present disclosure further provides a dynamic time-to-live (d-TTL) which allows intelligent allocation of resources based on a dynamic assignment of TTL for each 5G and LTE session. In one example, 4G components and 5G components may exchange notifications of control plane or user plane communications via the respective sessions. Thus, for example, if there has been no traffic on a 4G session, but the 5G session indicates that the connection to the PDN should continue, the 5G components may notify the 4G components such that the TTL for the 4G session can be extended. In one example, the notifications may be exchanged between AMF 135 and MME 131, or between respective cell sites and/or BBUs. In another example, the notifications may be sent to AS 195, which may control the d-TTL for both the 4G session and the 5G session through respective messages to MME 131, AMF 135 and/or SMF 137, and so forth.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In the above example, the interworking device comprises a dedicated device (e.g., AS 195). However, in another example, the interworking device may comprise another 5G core network (CN) component, such as AMF 135. It should also be noted that in one example, UE 106 may establish and maintain connections to the cellular core network 130 via multiple gNBs. However, for illustrative purposes, the example above is described where UE 106 connects to a single gNB (e.g., cell site 122 or cell site 123, or cell site 122 or cell site 123 in conjunction with baseband processing unit(s) from BBU pool 126). Thus, these and other modifications are all contemplated within the scope of the present disclosure.

Figure 2:
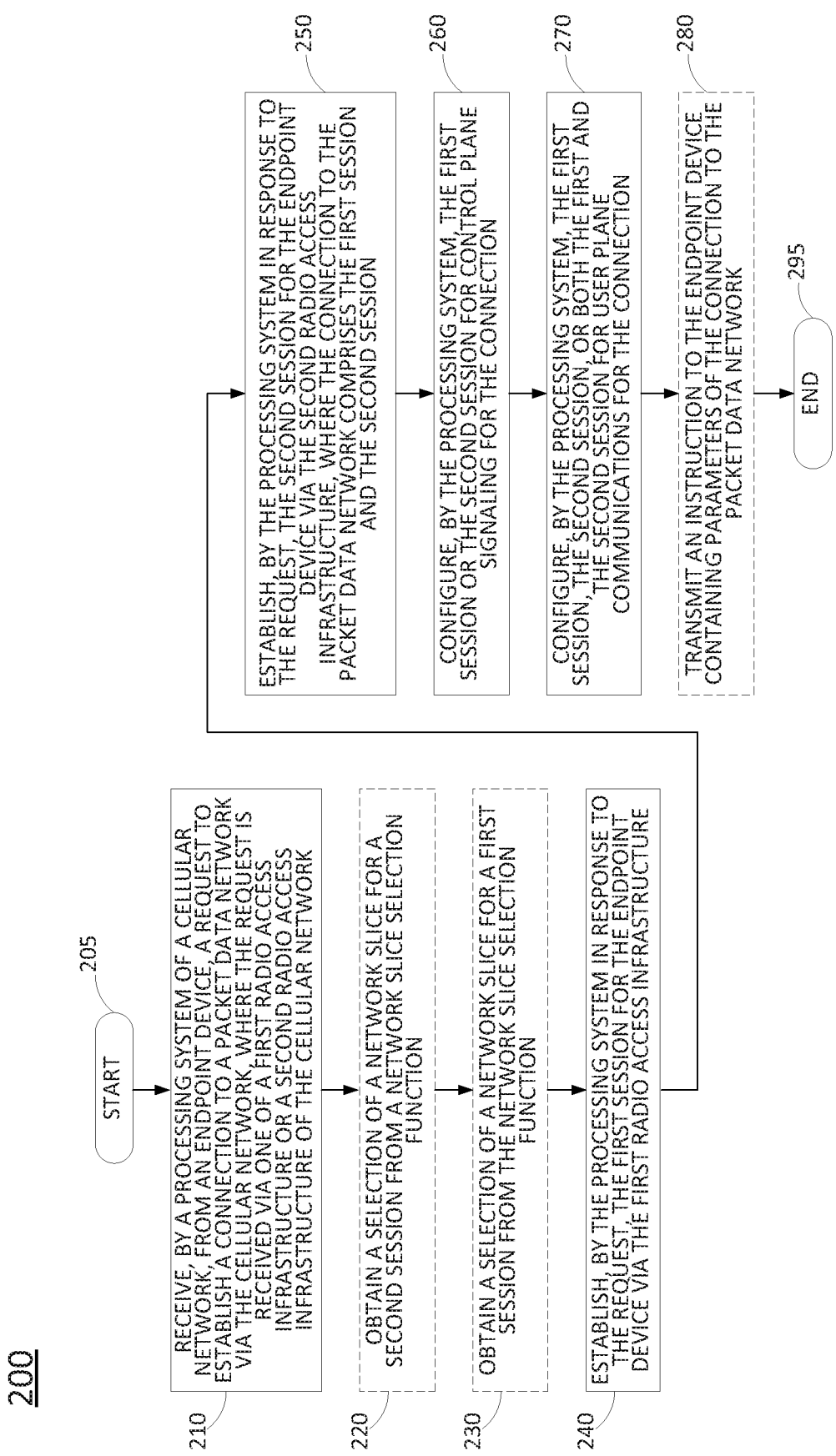
FIG. 2 illustrates a flowchart of an example method for establishing a dual session packet data network connection via a cellular network.

FIG. 2 illustrates a flowchart of an example method 200 for establishing a dual session packet data network connection via a cellular network, in accordance with the present disclosure. In one example, steps, functions and/or operations of the method 200 may be performed by a device as illustrated in FIG. 1, e.g., AS 195, AMF 135, or any one or more components thereof, such as a processing system, or collectively via a plurality devices in FIG. 1, such as 195 and/or AMF 135 in conjunction with MME 131, NSSF 136, SGW 132, PGW 134, SMF 137, UPF 139, any one or more of cell sites 121-124, and so forth. In one example, the steps, functions, or operations of method 200 may be performed by a computing device or system 300, and/or a processing system 302 as described in connection with FIG. 3 below. For instance, the computing device 300 may represent at least a portion of AS 195 and/or AMF 135 in accordance with the present disclosure. For illustrative purposes, the method 200 is described in greater detail below in connection with an example performed by a processing system, such as processing system 302. The method 200 begins in step 205 and proceeds to step 210.

At step 210, the processing system (deployed in a cellular network) receives, from an endpoint device, a request to establish a connection to a packet data network (PDN) via the cellular network, where the request is received via one of a first radio access infrastructure of the cellular network or a second radio access infrastructure of the cellular network. In one example, the first radio access infrastructure comprises 4G base station equipment/radio access network components, e.g., an eNodeB. In one example, the first radio access infrastructure comprises omnidirectional antennas. However, the omnidirectional antennas may utilize a reflective backplane such that a given antenna may generate transmit and receive beams in a particular sector (e.g., a 120 degree sector with a generally symmetric 60 degree half-power beamwidth, or the like). In one example, the first radio access infrastructure is configured to operate in a frequency band below 5 GHz. In one example, the first radio access infrastructure may be configured to operate within LTE frequency bands, e.g., generally 500 MHz to 3 GHz. The endpoint device may include a first radio and/or antenna that is designed for use in the same frequency band and which may be used to transmit the request via the first radio access infrastructure. In one example, the request may be forwarded by the first radio access infrastructure to an MME. In addition, in one example, the processing system may receive the request via the MME.

In one example, the endpoint device includes a second radio and/or antenna, e.g., including an MIMO beamforming-capable antenna array for 5G communications, that may be designed for operation in a frequency band greater than 5 GHz. In one example, the array for 5G may be designed for operation in a frequency band greater than 20 GHz. Similarly, the second radio access infrastructure may comprise 5G base station equipment/radio access network components, e.g., a 5G NR, or gNB. In one example, the request may be forwarded by the second radio access infrastructure to an AMF. In addition, in one example, the processing system may receive the request via the AMF. Although the request is received via one of the first radio access infrastructure or the second radio access infrastructure, in accordance with the present disclosure the connection to the PDN that is to be established includes both a first session via the first radio access infrastructure and a second session via the second radio access infrastructure.

At optional step 220, the processing system may obtain a selection of a network slice for the second session from a network slice selection function (NSSF). For instance, a network slice may comprise a set of cellular network components such as AMF(s), SMF(s), UPF(s), and so forth that may be arranged into different network slices which may logically be considered to be separate cellular networks. In one example, different base station equipment, or radio access infrastructure (e.g., RRHs, BBUs, etc.) may also be assigned to different network slices. In one example, different network slices may be preferentially utilized for different types of services. Thus, the network slice may be selected based upon the type of service associated with the request received from the endpoint device at step 210.

In one example, the processing system may also monitor a variety of conditions relating to the endpoint device and network conditions. For instance, the processing system may detect various conditions relating to time, endpoint device location, user preference, type of service, service conditions, network conditions, and/or device capability. In one example, the processing system may utilize one or more of these criteria as an alternative or in addition to the type of service in order to select the network slice for the second session among different available 5G-based network slices. For example, there may be more than one network slice that is designated for streaming video traffic. However, one of the network slices may be overloaded, one or more components thereof may be scheduled for maintenance or replacement, and so forth. As such, in one example, the processing system may select an alternative network slice that may also be designated to handle streaming video, even if such slice has a greater current load. Similarly, in another example, the processing system may select form among network slices based upon other criteria, such as minimizing an estimated latency, achieving a quality of service metric in accordance with a service level agreement (SLA) with a subscriber associated with the endpoint device, the request, and/or the packet data network, and so on.

At optional step 230, the processing system may obtain a selection of a network slice for the first session from the NSSF. For example, the first session may also be via a network slice of the cellular network. For instance, the cellular network may utilize a SDN-based LTE core network infrastructure with NFVI/host devices that can be configured and reconfigured as various LTE core network components. As such, in one example, the processing system may obtain a selection of a network slice for the first session for the endpoint device via the first radio access infrastructure from the NSSF. In one example, the same or similar criteria as described in connection with optional step 220 may also be used to determine the network slice for the first session among different available LTE-based network slices.

At step 240, the processing system establishes, in response to the request, the first session for the endpoint device via the first radio access infrastructure. In one example, the first session is further established via components of an evolved packet core (EPC), e.g., a serving gateway (SGW) and a packet data network gateway (PGW). In one example, the first session is established by transmitting an instruction to an MME to configure the SGW and PGW for the first session. If the request is received via the first radio access infrastructure at step 210, the instruction may be to the same MME via which the request is received. In one example, the same or a separate instruction may also signal to the MME to manage the session. In addition, in one example, the processing system may send an instruction to the first radio access infrastructure (e.g., an eNodeB) to configure the first radio access infrastructure to transmit and receive communications (e.g., user plane data) for the connection to the PDN via the SGW. In one example, the first session may be established in accordance with the selection of the network slice for the first session that may be obtained at optional step 230.

At step 250, the processing system establishes in response to the request, the second session for the endpoint device via the second radio access infrastructure of the cellular network. It should be noted that the connection to the packet data network comprises the first session and the second session. In one example, the second session is established via the network slice that may be identified at optional step 220. In one example, the second session is established via instructions to an AMF (e.g., when the processing system is not the AMF, or not a component thereof). In one example, the establishing of the second session may include configuring a user plane function (UPF) of the cellular network for the second session and configuring the second radio access infrastructure (e.g., a gNB) via an instruction to transmit and receive communications (e.g., user plane data) for the connection to the PDN via the UPF. In one example, the establishing of the second session may further include configuring a session management function (SMF) of the cellular network for managing the second session via the UPF and the AMF.

At step 260, the processing system configures the first session or the second session for control plane signaling for the connection. In one example, the processing system may select the first session or the second session for the control plane signaling based upon a variety of conditions relating to the endpoint device and network conditions, including the type of service associated with the request that is received at step 210. In one example, the processing system may monitor the same or similar criteria and conditions as described above in connection with steps 220 and 230 to determine whether to utilize the first session (e.g., the 4G radio access infrastructure) or the second session (e.g., the 5G radio access infrastructure) for the control plane data associated with the connection. For example, the processing system may detect various conditions relating to time, endpoint device location, user preference, type of service, service conditions, SLA, network conditions, and/or device capability that may cause the processing system to select either the 4G radio access infrastructure or the 5G radio access infrastructure for the control plane of the connection between the endpoint device and the PDN.

To illustrate, in one example, the processing system may be configured with a preference to utilize the first session (e.g., using the first (4G) radio access infrastructure) for the control plane since the effective communication distances between a base station and endpoint device are typically greater using 4G frequencies as compared to the higher frequencies designated for high-data rate communications of 5G. Similarly, the loss through building walls and other obstructions may generally be considered less for 4G frequencies as compared to the higher 5G millimeter wave frequencies. Hence, the reliability of the control plane may be better with 4G as compared to 5G, depending upon the particular circumstances. The preference may be overridden based upon certain criteria, such as if the endpoint device is determined to be stationary and within a 5G coverage footprint, if the 4G radio access infrastructure is overloaded, if there are greater than a threshold number of transmit-receive beam pairs between the endpoint device and a gNB with a signal strength above a threshold, and so forth. In another example, there may be a preference to utilize the second session for the control plane when there is an enhanced security requirement for the connection, e.g., based upon the type of service being requested, based upon the endpoint device and/or the SLA of the customer associated with the endpoint device, based upon the identity of the PDN to which the connection is requested, and so forth.

At step 270, the processing system configures the first session, the second session, or both the first session and the second session for user plane communications for the connection. In one example, step 270 may include assigning a first data volume or a first percentage of user plane data of the connection to the first session, and assigning a second data volume or a second percentage of user plane data of the connection to the second session. In one example, the assigning the first data volume or the first percentage and the assigning the second data volume or the second percentage are based upon a time, an endpoint device location, a user preference, an SLA, a type of service, service conditions, network conditions, and/or device capability. For example, as described above, the processing system may monitor a variety of conditions that may individually or collectively cause the processing system to apportion respective data volumes or percentages of user plane data of the connection of the endpoint device to the PDN over the 4G radio access infrastructure and the 5G radio access infrastructure.

To illustrate, in one example, if the connection is for a video conference service, the processing system may be configured to assign a voice portion of the connection to the first session (e.g., the 4G radio access infrastructure) and an video image portion to the second session (e.g., the 5G radio access infrastructure). In another example, both voice and video image may be apportioned to the second session, while the first session may not be utilized for user plane data. For instance, the first session may be utilized for the control plane and the second session may be utilized for the user plane. In still another example, there may be a preference for both control plane data and user plane data to utilize the second session (the 5G session). However, as 5G infrastructure is gradually deployed in the cellular network, there may be insufficient capacity to accommodate all demand for 5G. As such, in one example, the processing system may assign a percentage of the user plane data to utilize the second session, with the remainder being assigned to the first session. In addition, in one example, the same or a different type of apportionment may be applied to other endpoint devices or other subscribers within a same geographic area (e.g., a same cell site, service area, etc.), to other requests to connect to the same PDN, and so forth, depending upon the current load of 5G infrastructure within the relevant network slice or other relevant portion of the cellular network, etc.

At optional step 280, the processing system may transmit an instruction to the endpoint device containing parameters of the connection to the packet data network. In one example, the parameters include an identification of the first session or the second session that is configured for control plane signaling for the connection. The parameters may further include an apportionment of data volumes or percentages of user plane data of the connection of the endpoint device to the PDN over the 4G radio access infrastructure and the 5G radio access infrastructure. Following step 270 or optional step 280, the method 200 may proceed to step 295 where the method ends.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for transferring a connection to a packet data network from a first session via a first radio access infrastructure to a second session via a second radio access infrastructure, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for transferring a connection to a packet data network from a first session via a first radio access infrastructure to a second session via a second radio access infrastructure (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for transferring a connection to a packet data network from a first session via a first radio access infrastructure to a second session via a second radio access infrastructure (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving from an endpoint device, by a processing system of a cellular network including at least one processor, a request to establish a connection to a packet data network via the cellular network, wherein the request is received via one of a first radio access infrastructure of the cellular network or a second radio access infrastructure of the cellular network, wherein the first radio access infrastructure comprises long term evolution radio access components and wherein the second radio access infrastructure comprises fifth generation radio access components;
establishing, by the processing system in response to the request, a first session for the endpoint device via the first radio access infrastructure;
establishing, by the processing system in response to the request, a second session for the endpoint device via the second radio access infrastructure of the cellular network, wherein the connection to the packet data network comprises the first session and the second session;
configuring, by the processing system, a first one of the first session or the second session for control plane signaling for the connection, wherein the control plane signaling is for both the first session and the second session;
configuring, by the processing system, at least a second one of the first session or the second session for user plane communications for the connection, wherein the configuring the at least the second one of the first session or the second session for the user plane communications for the connection comprises:
assigning a first data volume or a first percentage of user plane data of the connection to the first session; and
assigning a second data volume or a second percentage of user plane data of the connection to the second session; and
transmitting, by the processing system, an instruction to the endpoint device containing at least one parameter of the connection to the packet data network, wherein the at least one parameter includes an identification of the first one of the first session or the second session that is configured for control plane signaling for the connection.

2. The method of claim 1, wherein the assigning the first data volume or the first percentage and the assigning the second data volume or the second percentage are based upon:
a time of day;
a location;
an event;
an indication of a user preference for the second session;
a service performance;
a condition of the cellular network; or
a capability of the endpoint device.

3. The method of claim 1, wherein the endpoint device utilizes a first radio for the connection to the packet data network via the first session and a second radio for the connection to the packet data network via the second session, and wherein the first radio and the second radio are both activated for the connection.

4. The method of claim 1, wherein the first radio access infrastructure is configured to operate in a frequency band below 5 gigahertz and wherein the second radio access infrastructure is configured to operate in a frequency band above 5 gigahertz.

5. The method of claim 4, wherein the second radio access infrastructure is configured to operate in a frequency band above 20 gigahertz.

6. The method of claim 1, wherein the second radio access infrastructure comprises multiple-in/multiple-out beamforming components.

7. The method of claim 1, wherein the first session is via a first network slice of the cellular network and wherein the second session is via a second network slice of the cellular network, the method further comprising:
obtaining a selection of the first network slice from a network slice selection function; and
obtaining a selection of the second network slice from the network slice selection function.

8. The method of claim 1, wherein the first session is further established via a serving gateway and a packet data network gateway, and wherein the first session is established by transmitting an instruction to a mobility management entity to configure the serving gateway and packet data network gateway for the first session.

9. The method of claim 8, wherein the request is received from the mobility management entity.

10. The method of claim 8, wherein the first session is further established by configuring the first radio access infrastructure to transmit and receive the user plane communications for the connection to the packet data network via the serving gateway.

11. The method of claim 10, wherein, when the first session is configured for the control plane signaling for the connection, the configuring of the first session for the control plane signaling comprises configuring the first radio access infrastructure to transmit and receive the control plane signaling for the connection to the packet data network via the mobility management entity.

12. The method of claim 1, wherein the request is received from an access management function of the cellular network.

13. The method of claim 1, wherein the second session is established by:
configuring a user plane function of the cellular network for the second session; and
configuring the second radio access infrastructure to transmit and receive the user plane communications for the connection to the packet data network via the user plane function.

14. The method of claim 13, wherein the second session is established by transmitting an instruction to an access management function of the cellular network to configure the user plane function of the cellular network.

15. A non-transitory computer-readable medium storing instructions which, when executed by a processing system of a cellular network including at least one processor, cause the processing system to perform operations, the operations comprising:
receiving, from an endpoint device, a request to establish a connection to a packet data network via the cellular network, wherein the request is received via one of a first radio access infrastructure of the cellular network or a second radio access infrastructure of the cellular network, wherein the first radio access infrastructure comprises long term evolution radio access components and wherein the second radio access infrastructure comprises fifth generation radio access components;
establishing, in response to the request, a first session for the endpoint device via the first radio access infrastructure;

establishing, in response to the request, a second session for the endpoint device via the second radio access infrastructure of the cellular network, wherein the connection to the packet data network comprises the first session and the second session;

configuring a first one of the first session or the second session for control plane signaling for the connection, wherein the control plane signaling is for both the first session and the second session;

configuring at least a second one of the first session or the second session for user plane communications for the connection, wherein the configuring the at least the second one of the first session or the second session for the user plane communications for the connection comprises:

assigning a first data volume or a first percentage of user plane data of the connection to the first session; and assigning a second data volume or a second percentage of user plane data of the connection to the second session; and transmitting an instruction to the endpoint device containing at least one parameter of the connection to the packet data network, wherein the at least one parameter includes an identification of the first one of the first session or the second session that is configured for control plane signaling for the connection.

16. A device comprising:

a processing system including at least one processor; and a non-transitory computer-readable medium storing instructions which, when executed by the processing system when deployed in a cellular network, cause the processing system to perform operations, the operations comprising:

receiving, from an endpoint device, a request to establish a connection to a packet data network via the cellular network, wherein the request is received via one of a first radio access infrastructure of the cellular network or a second radio access infrastructure of the cellular network, wherein the first radio access infrastructure comprises long term evolution radio access components and wherein the second radio access infrastructure comprises fifth generation radio access components;

establishing, in response to the request, a first session for the endpoint device via the first radio access infrastructure;

establishing, in response to the request, a second session for the endpoint device via the second radio access infrastructure of the cellular network, wherein the connection to the packet data network comprises the first session and the second session;

configuring a first one of the first session or the second session for control plane signaling for the connection, wherein the control plane signaling is for both the first session and the second session;

configuring at least a second one of the first session or the second session for user plane communications for the connection, wherein the configuring the at least the second one of the first session or the second session for the user plane communications for the connection comprises:

assigning a first data volume or a first percentage of user plane data of the connection to the first session; and assigning a second data volume or a second percentage of user plane data of the connection to the second session; and transmitting an instruction to the endpoint device containing at least one parameter of the connection to the packet data network, wherein the at least one parameter includes an identification of the first one of the first session or the second session that is configured for control plane signaling for the connection.

17. The device of claim 16, wherein the assigning the first data volume or the first percentage and the assigning the second data volume or the second percentage are based upon:

a time of day;
a location;
an event;
an indication of a user preference for the second session;
a service performance;
a condition of the cellular network; or
a capability of the endpoint device.

18. The device of claim 16, wherein the endpoint device utilizes a first radio for the connection to the packet data network via the first session and a second radio for the connection to the packet data network via the second session, and wherein the first radio and the second radio are both activated for the connection.

19. The device of claim 16, wherein the first radio access infrastructure is configured to operate in a frequency band below 5 gigahertz and wherein the second radio access infrastructure is configured to operate in a frequency band above 5 gigahertz.

20. The device of claim 19, wherein the second radio access infrastructure is configured to operate in a frequency band above 20 gigahertz.

* * * * *